United States Patent
Kanno et al.

(10) Patent No.: US 7,285,250 B2
(45) Date of Patent: Oct. 23, 2007

(54) APPARATUS FOR TREATING PERFLUOROCOMPOUND GAS

(75) Inventors: Shuichi Kanno, Hitachi (JP); Hisao Yamashita, Hitachi (JP); Tomohiko Miyamoto, Takahagi (JP); Shin Tamata, Oarai-machi (JP); Yoshiki Shibano, Hitachi (JP); Takeo Komuro, Hitachi (JP); Tsugihiro Yukitake, Tokai-mura (JP); Terufumi Kawasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 10/137,449

(22) Filed: May 3, 2002

(65) Prior Publication Data

US 2002/0122750 A1    Sep. 5, 2002

Related U.S. Application Data

(62) Division of application No. 09/651,783, filed on Aug. 30, 2000.

(51) Int. Cl.
*B01D 50/00* (2006.01)
*B01D 59/50* (2006.01)

(52) U.S. Cl. ............... 422/171; 422/172; 422/173; 55/337; 55/459.1

(58) Field of Classification Search ........... 422/177, 422/169, 171, 172; 55/90; 423/210
See application file for complete search history.

(56) References Cited

U.S. PATENT DOCUMENTS 4,022,593 A * 5/1977 Lerner .................... 95/273
5,478,484 A * 12/1995 Michaluk ................ 210/788
5,955,037 A * 9/1999 Holst et al. .............. 422/171

FOREIGN PATENT DOCUMENTS

| EP | 768109 | A2 * | 4/1997 |
| EP | 885648 | A1 * | 12/1998 |
| EP | 916388 | A2 * | 5/1999 |
| EP | 1101524 | A2 * | 5/2001 |
| EP | 1240937 | A1 * | 9/2002 |
| JP | 57-197023 | | 12/1982 |
| JP | 4-290523 | | 10/1992 |
| JP | 5-245321 | | 9/1993 |
| JP | 5-277332 | | 10/1993 |
| JP | 8-318122 | | 12/1996 |
| JP | 10-137544 | | 5/1998 |
| JP | 10-286434 | | 10/1998 |
| JP | 11-70322 | | 3/1999 |
| JP | 11-216455 | | 8/1999 |

* cited by examiner

*Primary Examiner*—Glenn Caldarola
*Assistant Examiner*—Tom Duong
(74) *Attorney, Agent, or Firm*—Mattingly, Stanger, Malur & Brundidge, P.C.

(57) ABSTRACT

In order to prevent exhaust pipe for exhausting perfluorocompound (PFC) decomposition gas after washing from corrosion, a mist separating apparatus is provided at a rear stage of the washing tower for washing the PFC decomposition gas. The corrosion of the exhaust pipe can be prevented by removing the mist from the washed gas.

6 Claims, 5 Drawing Sheets

FROM EXHAUST GAS
WASHING TOWER 13

APPARATUS FOR TREATING PERFLUOROCOMPOUND GAS

This is a divisional application of U.S. Ser. No. 09/651,783, filed Aug. 30, 2000.

BACKGROUND OF THE INVENTION

The present invention relates to a method for treating perfluorocompound (PFC) gas, and an apparatus thereof.

PFC a general term of $CF_4$, $C_2F_6$, $C_3F_8$, $SF_6$, $NF_3$, and the like. PFC gas is used as an etching gas for semiconductor, a cleaning gas for semiconductor, an insulating gas, and others. The PFC gas is a kind of earth warming-up gas, and its release to atmosphere is an object of regulation. Therefore, various methods for decomposition of PFC have been investigated. One of the methods, wherein PFC gas is decomposed by hydrolysis; subsequently, the decomposed gas is treated with water or an alkaline aqueous solution; and the treated gas is exhausted to atmosphere; has been disclosed in JP-A-11-70322 (1999).

During study of the PFC treating method, wherein the PFC gas is decomposed; the decomposed gas is washed; and the washed gas is exhausted; the inventors of the present invention have found that exhaust blowers and exhaust pipe for exhausting the washed gas are corroded with the washed gas.

The present invention is aimed at suppressing the corrosion of the exhaust blowers and the exhaust pipe with the washed PFC decomposed gas in the method or the apparatus for treating the PFC decomposed gas.

The gist of the present invention is in exhausting the PFC decomposed gas after washing the PFC decomposed gas and separating mist containing PFC decomposition products contained in the decomposed gas.

The inventors of the present invention have found that the corrosion of exhaust pipe and exhaust blowers is caused by the PFC decomposed gas; which has not removed by washing in the washing step, releasing to outside of the washing tower accompanied with mist, and adhering to the to the exhaust blower or the exhaust pipe. Therefore, the inventors have succeeded in suppressing the corrosion of the exhaust pipe and the exhaust blowers by separating the mist from the washed PFC decomposed gas.

A large proportion of the mist contained in the gas after the washing step have mainly a particle size larger than 10 μm, and the mist having a particle size smaller than 1 μm are utmost a several tens percent. In order to remove the mist having such a particle size distribution, cyclone separators, filter separators, electric dust collectors, active carbon adsorption apparatus, and the like are suitable. In particular, the cyclone separators and the filter separators are desirable, because their apparatus can be made small size. When the filter separator is used, it is desirable that plural filters having different pore sizes each other are overlapped, and large size mist is separated by the filter having larger pore size and small size mist is separated by the filter having smaller pore size. If only the filter having smaller size is used, passing the gas through the filter is disturbed. Then, it is not desirable, because the pressure loss at the filter is increased, and use of large size blowers is required. The pressure loss can be restricted to small by combining plural filters having different pore sizes each other.

The present invention can be applied to a method, wherein the PFC gas is decomposed by hydrolysis, oxidation decomposition, combustion, or thermal decomposition, and the like to a gas containing hydrogen fluoride, and washed and exhausted. In addition to the above method, the present invention can be applied to any methods, if the method decomposes PFC gas to the gas containing hydrogen fluoride. In accordance with converting PFC to hydrogen fluoride, the hydrogen fluoride can be removed from the gas by absorbing into a solution by washing with water or an alkaline aqueous solution, and the gas released from the washing tower can be made a gas which substantially does not contain fluoride compounds.

Prior art, wherein the mist is separated from the exhaust gas after washing the exhaust gas, is disclosed in JP-A-11-216455 (1999), but the prior art is not aimed at treating the PFC decomposed gas. JP-A-8-318122 (1996) and JP-A-57-197023 have disclosed methods, wherein an absorption tower is installed after water washing apparatus in the process, but the prior art are not aimed at treating the corrosive mist of PFC decomposed gas, neither.

SUMMARY OF THE INVENTION

When $SF_6$ or $NF_3$ is decomposed by hydrolysis, reactions expressed by the following equations (1) and (2) are theoretically proceeded:

$$SF_6 + 3H_2O \rightarrow SO_3 + 6HF \quad \text{(equation (1))}$$

$$2NF_3 + 3H_2O \rightarrow NO + NO_2 + 6HF \quad \text{(equation (2))}$$

The decomposition products such as $SO_3$, HF, $NF_3$, $H_2O$ can be removed from the decomposed gas by washing with water or an alkaline aqueous solution at a washing tower.

However, a part of HF, $SO_3$, $NO_2$, and the like, which have not been removed, become mist accompanied with water, and pass through the washing tower. For instance, it was revealed that $SO_3$ of 1 mole was accompanied with water of approximately 250 moles. If the mist is exhausted into the exhaust line, the mist is condensed at a portion where the temperature of the exhaust gas is lowered below the dew point, and is adhered rigidly on the inner wall of the exhaust pipe to cause choking of the pipe. Otherwise, the mist is adhered rigidly on the inside of the exhaust blower, and use of the exhaust blower becomes impossible. In a case when $NF_3$ is treated, mist of nitric acid is generated during the washing operation. The mist of nitric acid is flowed into the exhaust pipe, and sometimes causes corrosion of the exhaust pipe and others. In a case when carbon group PFC gas is treated, the exhaust pipe or the exhaust blower are corroded mainly by HF gas.

The particle size of the mist, which was contained in the exhaust gas passed through the washing tower, was measured using an impactor type particle size detector. As the result, the particle size of the mist of equal to or larger than 11 μm was approximately 60%; of equal to or smaller than 1 μm was approximately 30%; and the rest was in the range of 1 μm-10 μm.

The cyclone type mist separator is an apparatus for removing small solid particles or droplets in gas stream using a centrifugal force. Schematic illustrations of the cyclone type separator are indicated in FIG. 2A and FIG. 2B. FIG. 2A is a plan view, and FIG. 2B is a side cross section. In accordance with the cyclone type mist separator 21, the gas containing mist is introduced into inside of the cyclone through the gas inlet 22 with a high speed. The mist introduced into the inside of the cyclone is driven in a direction toward outside by the centrifugal force, and collided with the inner wall 23 of the cylinder. The mist collided with the inner wall 23 is exhausted from a lower liquid waste outlet 24 at the bottom portion of the cylinder. The gas removed the mist is flowed upwards through the inner cylinder 26, and released from the upper gas exhaust outlet. The liquid contained in the gas flowed through the inner cylinder 26 is exhausted from the upper liquid outlet 25. The size of the cyclone (the size of the portion at the maximum diameter of the inner wall 23) is desirably decided depending on the diameter of the droplet to be removed. If the inner diameter of the gas inlet 22 is small and velocity of the gas at the inlet is fast, the centrifugal force becomes large, and small mist can be removed. For instance, in order to remove the mist of approximately 1 μm, the diameter of the gas inlet is desirably made approximately 1 cm, and the gas velocity at the inlet is made approximately 20 m/sec. A high mist removal rate can be obtained by setting the condition in the range as above. Although the mist removal rate is increased as the gas velocity is increased, pressure loss is also increased. The material of the cyclone is desirably vinyl chloride, acrylate resin, and the like, which are superior in corrosion resistance.

The filter type mist separator catches the mist in the gas flow using a filter having many fine pores. A schematic cross section of the filter type mist separator is indicated in FIG. 3. FIG. 3 indicates an example, wherein two filters 32, 33 having different pore sizes each other are overlapped. In accordance with the filter type mist separator 30, the filters 32, 33 are provided at approximately middle portion in the cylinder, the gas is introduced into the cylinder from the bottom portion and exhausted from the top portion. The filters 32, 33 are fixed to the cylinder by the flange 35 via the packing 34. The liquid accompanied with the gas passed through the filter is exhausted to outside of the cylinder through upper liquid outlet 36.

When the gas velocity at the filter is in the range of 5-25 cm/sec., use of the filter having pore size of smaller than 250 μm is desirable in order to remove the mist of 1 μm, in particular, use of the filter having pore size of smaller than 160 μm is preferable. Even the filter is used, the removing rate of the mist is decreased if the pore size is large, and if the pore size is small, the pressure loss is increased. As the material of the filter, commercially available filter made of glass can be used. However, if an acidic gas such as HF is contained in the gas, the filter made of ceramics is desirable. When the filter is used, the filter can be provided in an exhaust gas washing tower. For instance, the filter is provided at upper side of the spray nozzle in a spray type washing tower, in order to remove the mist contained in the washed gas.

The electric dust collector collects the mist by flowing the gas in a strong electric field to charge static electricity, and collecting the mist at an opposite electrode portion. A schematic cross section of the electric dust collector is indicated in FIG. 4. In accordance with the electric dust collector 40, a discharge electrode 44 is supported by the discharge electrode supporting rods 41, 42, which are arranged at the upper portion and the lower portion of the collector, and a cylindrical dust collecting electrode 43 is provided facing to the discharge electrode 44. The discharge electrode 44 and the dust collecting electrode 43 are connected to a high voltage power supply 45. The gas to be treated is introduced from the lower gas inlet, and exhausted from the top portion. The liquid separated from the gas is exhausted from the liquid outlet 46. In case of the electric dust collector, it is desirable to charge a voltage higher than 8 kV. It is desirable to flow air to the electrode portion, in order to prevent the electrode from adhering the mist. If the mist is adhered to the electrode, the voltage can not be elevated because of shortage of the circuit. As material of the electrode for dust collector, tungsten wire, SUS wire, and the like can be used.

The active carbon absorption apparatus is an apparatus for absorbing the mist by active carbon. A schematic composition of the active carbon absorption apparatus is indicated in FIG. 5. The active carbon absorption apparatus indicated in FIG. 5 comprises two towers, absorption•regeneration towers, 51, 52, filled with active carbon 59. When one of them is used in an absorption step, the other is used in a regeneration step. During the absorption step, the gas is introduced into the absorption•regeneration tower from the bottom portion of the active carbon 59, and exhausted from the top portion through the active carbon layer. During the regeneration step, water 10 is supplied into the tower from the inlet 53 to wash away the mist adhered to the active carbon, and the water is exhausted to outside of the tower from the liquid outlet 54. Subsequently, in order to dry the active carbon, air is supplied into the tower from the gas inlet 55, and exhausted from the tower 58 from the gas outlet 56 by the exhaust blower 57. The space velocity of the gas in the active carbon layer is desirably in the range of 300-400 $h^{-1}$. When the amount of the gas to be treated is 75 liter/min., the active carbon of 10-15 liter is sufficient. The water flow for regenerating the active carbon can be always flowed, or can be flowed only during the regeneration step by storing the water in the tower. When the mist contains $SO_3$ and others, sulfuric acid is absorbed onto the active carbon. Therefore, the water used for regenerating the active carbon contains sulfuric acid, but because $SO_3$ and others can be absorbed, the water can be recycled to the exhaust gas washing tower. However, if pH is lowered, $SO_3$ can not be absorbed. Accordingly, control of the pH is required.

When the mist is removed by the mist separating apparatus such as cyclone, filter, and others, control of the flow rate of the gas introduced into the mist separating apparatus is important. When the flow rate of the gas introduced into the mist separating apparatus is decreased by decreasing the amount of the gas introduced into the PFC decomposition apparatus, it is desirable to adjust the flow rate of the gas to a designated flow rate (a set flow rate used when the mist decomposition apparatus is designed) by adding in-leak gas, and other methods. In the case of the active carbon absorption apparatus, adjusting the flow rate is not necessary, because, even if the flow rate is decreased, the contact time is extended, and the mist removal performance is not decreased.

BRIEF DESCRIPTION OF THE DRAWINGS

These and other objects, features and advantages of the present invention will be understood more clearly from the following detailed description with reference to the accompanying drawings, wherein.

DETAILED DESCRIPTION OF THE PREFERRED EMBODIMENTS

Hereinafter, embodiments of the present invention are explained using the drawings. However, the present invention is not restricted by the following embodiments.

Figure 1:
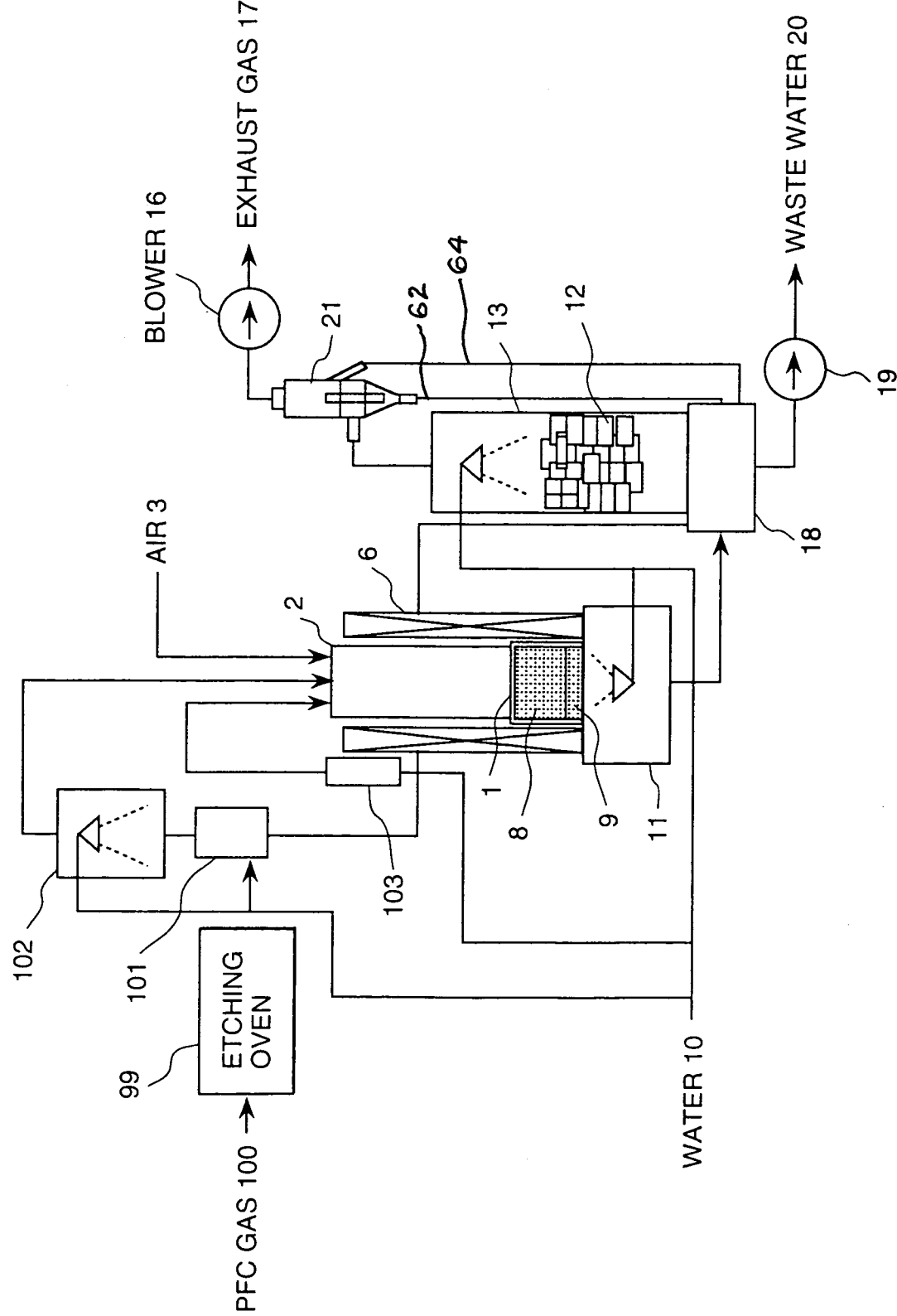
FIG. 1 is a schematic illustration indicating an example of the PFC treating apparatus relating to the present invention installed with a semiconductor etching oven.

FIG. 1 indicates an example, wherein the PFC removing apparatus of the present invention is installed with a semiconductor etching oven.

In accordance with the etching oven 99, etching of semiconductor wafers is performed with PFC gas 100 such as $SF_6$ and others in the etching oven under a reduced pressure. After finishing the etching, PFC gas is exhausted by pumping the atmosphere in the etching oven by a vacuum pump (not shown in the figure). At that time, $N_2$ gas is flowed into the pump for diluting the concentration of the PFC to a several percent, in order to protect the pump from corrosion.

The exhaust gas from the etching oven is introduced into a tower 101 packed with plastic particles and others for removing solid articles, and then, introduced into a spray tower 102 for removing water-soluble component, before entering into the PFC decomposition tower 1. The gas through the spray tower 102 is heated to a PFC decomposition temperature at a pre-heater 2. Because the PFC decomposition tower 1 of the present embodiment is a type to decompose the PFC by hydrolysis, air 3 and water 10 which is passed through an ion exchange resin layer 103 are supplied to the pre-heater 2. The water is vaporized at the pre-heater 2. The concentration of the PFC at the outlet of the pre-heater 2 is desirably in the range of approximately 0.1-1%, and steam is adjusted desirably to be 25-100 times of moles of the fluorine compounds. The air 3 is desirably added so that the concentration of the oxygen in the reaction gas to be approximately 4%. The above mixed gas, that is, the reaction gas is introduced into the PFC decomposition tower 1 which is installed at the outlet of the pre-heater 2. In accordance with the present embodiment, assuming that the PFC is $SF_6$, or a gas containing $SF_6$, PFC decomposition catalyst 8 and hazardous component removing catalyst 9 are pacjed into the PFC decomposition tower 1. The hazardous component here means CO, $SO_2F_2$, and the like. The mixed gas is contacted with the catalyst under the condition that the space velocity is 1,000 $h^{-1}$, and reaction temperature at 650-850° C. The space velocity ($h^{-1}$) is a value obtained by the following equation:

The flow rate of the reaction gas (ml/h)/the amount of the catalyst (ml).

In the PFC decomposition tower, the catalyst and the reaction gas desirably heated by a heater 6 such as an electric heater and the like. The reaction gas exhausted from the PFC decomposition tower 1 is introduced into the cooling chamber 11, and cooled by water 10 sprayed from the spray nozzle. HF and the water soluble component in the gas passed through the cooling chamber are removed by absorbing into water 10 at the exhaust gas washing tower 13. Then, the gas is introduced into the mist removal apparatus. In accordance with the present embodiment, packing material 12 such as an absorbing agent and the like is filled into the exhaust gas washing tower 13, in order to increase a contact efficiency of the gas with water. A cyclone type mist separating apparatus 21 is provided. The gas removed the mist is released into atmosphere as an exhaust gas 17 by sucking the gas with the blower 16. The waste water 20 absorbed HF and others at the exhaust gas washing tower 13 is stored in the storage tank 18 once, and released by the waste water pump 19. The waste water 20 can be made harmless by a ready-made waste water treating facility in the semiconductor factory. The mist separated by the cyclone can also be stored in the waste water tank. As shown in FIG. 1, the mist separating apparatus has a direct piping connection 62 from the lower liquid waste outlet to the storage tank and a direct piping connection 64 from the upper liquid waste outlet to the storage tank.

As the PFC decomposition catalyst 8, for example, Al containing at least one of element selected from the group consisting of Zn, Ni, Ti, Fe, Sn, Co, Zr, Ce, Si, Pt, and Pd, can be used, but it is restricted by the above example. These PFC decomposition catalyst can be used in a form of oxide, metal, complex oxide, and others. A catalyst composed of $Al_2O_3$ and at least one of Ni, Zn, and Ti has a high decomposition performance, and is significantly preferable.

As the washing tower, any of a spray type which spray water or an alkaline aqueous solution, a bubbling type which makes the decomposition gas bubbling into the water or an alkaline aqueous solution, and a catching type which catches the decomposed gas by a washing tower packed with an absorbing agent or an alkaline solid body such as KOH, NaOH, $Ca(OH)_2$, $Mg(OH)_2$, and the like, and others are usable. Among them, the spray type washing tower is the most preferable, because it has a high efficiency, and choking of the gas flow by precipitation of crystals in the washing tower is hardly occurred.

Because corrosive gas is flowed in the exhaust gas pipe from the washing tower, the exhaust gas pipe is desirably made of a high corrosion resistant material such as vinyl chloride, acrylate resin, and the like, or of a material both planes of which are coated with the above corrosion resistant material. Material for the exhaust gas blower is similar with the exhaust gas pipe.

Embodiment 1

Figure 2A:
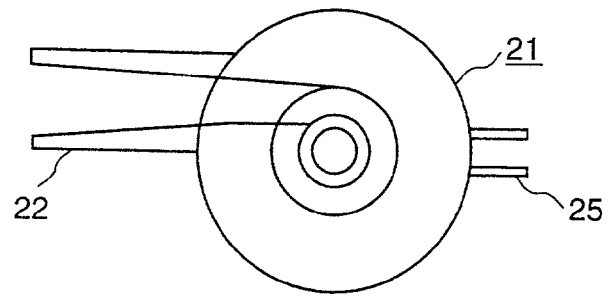
FIG. 2A is a schematic plan view of a cyclone mist separator.
Figure 2B:
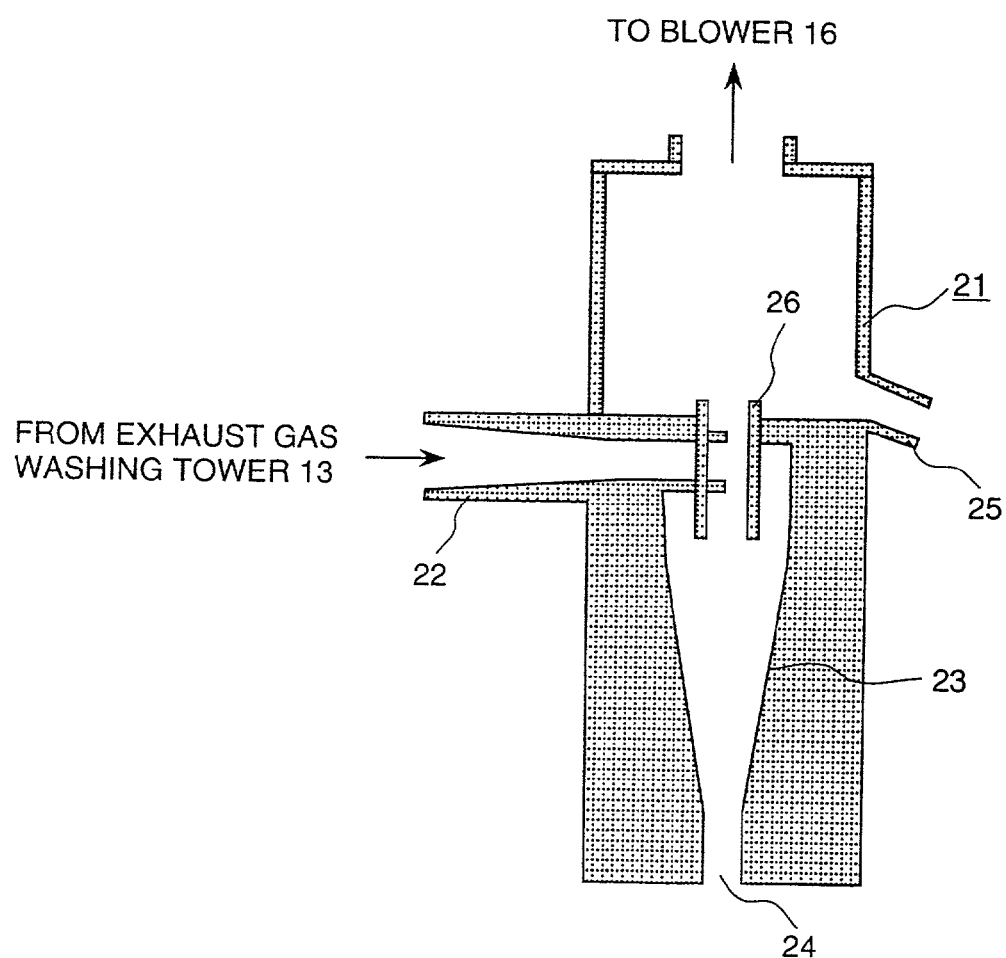
FIG. 2B is a schematic side cross section of the same.

Treatment of $SF_6$ was performed by the PFC treatment apparatus indicated in FIG. 1 except the etching oven 99, the packed tower 101, and the spray tower 102. The $SF_6$ was diluted by adding nitrogen gas to be approximately 5000 ppm. The diluted gas was added with air 3, and heated by the pre-heater 2. Deionized water was vaporized by introducing into the pre-heater 2 to be steam of 33-37 times of theoretical amount. The reaction gas adjusted above was introduced into the PFC decomposition tower 1, which had been heated by the heater 6, and contacted with a $SF_6$ decomposition catalyst and a $SO_2F_2$ decomposition catalyst. As the $SF_6$ decomposition catalyst, a catalyst composed of Ni and $Al_2O_3$ was used, and as the $SO_2F_2$ decomposition catalyst, a catalyst composed of Pd, La, and $Al_2O_3$ was used. These catalyst were maintained at a temperature in the range of 700-800° C. The space velocity of the reaction gas was 1000 $h^{-1}$. The gas treated at the exhaust gas washing tower was introduced into the cyclone type mist separator 21 of 24 mm in inner diameter (the maximum diameter portion) and 111 mm in height under a condition that the entrance velocity was approximately 20 m/sec. The cyclone type mist separator having the structure indicated in FIG. 2A and FIG. 2B was used. The inner diameter of the liquid outlet 24 was 14 mm. The impeller portion of the exhaust blower was coated with an epoxy group corrosion resistant material.

A mist removal rate was calculated by measuring $SO_3$ concentration in the gas before and after the cyclone type mist separator. The $SO_3$ concentration was taken as a value which was obtained by subtracting the $SO_3$ concentration measured by a gas chromatography from the $SO_3$ concentration measured by a gas collecting method. As the result, the $SO_3$ concentration before the mist separator was 153 ppm, the $SO_3$ concentration after the mist separator was 30 ppm, and it was revealed that the mist was removed by 80%. The exhaust blower 16 was left one day after the test and disassembled, but no corrosion could be observed.

The method for preparing the catalyst used in the test was as follows:

$Al_2O_3$ Catalyst Containing Ni:

Commercial available boehmite powder was dried at 120° C. for 1 hour. An aqueous solution of nickel nitrate hexahydrate 210.82 g was added to the dried boehmite powder 200 g, and kneaded. After kneading, the mixture was dried at 200-300° C. for approximately 2 hours, and calcined at 700° C. for 2 hours. After the calcination, the calcined body was pulverized, and sieved to a diameter in the range of 0.5-1 mm. The composition of the catalyst after the preparation was Al:Ni=80:20 (mole %) in atomic ratio, and $NiAl_2O_4$, and NiO were observed by X-ray diffraction analysis of the catalyst. No $Al_2O_3$ peak could be observed clearly.

$Al_2O_3$ Catalyst Containing Pd, La:

Commercial available $Al_2O_3$ granules of 2-4 mm in diameter (made by Sumitomo Chemicals Co. NKHD-24) were crushed to 0.5-1 mm in diameter, and dried at 120° C. for 1 hour. An aqueous solution of lanthanum nitrate hexahydrate was impregnated into the dried $Al_2O_3$ granules so that the $La_2O_3$ weight to be 10% by weight. That is, lanthanum nitrate hexahydrate 26.84 g was dissolved into deionized water, the aqueous solution was impregnated into 100 g of $Al_2O_3$, the mixture was dried at 120° C. for 2 hours, and calcined. By the calcination, $Al_2O_3$ containing La was obtained. An aqueous solution of palladium nitrate was impregnated into the $Al_2O_3$ containing La so that the palladium weight to be 0.5% by weight. Practically, an aqueous solution 11.26 g of palladium nitrate 4.439% by weight was dissolved into deionized water and impregnated into the $Al_2O_3$ containing La 100 g. After the impregnation, the impregnated $Al_2O_3$ was dried at 120° C. for 2 hours, and calcined.

COMPARATIVE EXAMPLE

The similar experiment as the embodiment 1 was performed without using the mist separating apparatus in the embodiment 1 under the condition that the coating on the blower was removed. As the result, mist was introduced into the blower, and acidic water dissolving $SO_3$ was remained at the inlet and the outlet of the gas. After finishing the test, the blower was left one day as it was. Corrosion product was generated on the blower, and choking the gas flow path was observed. The corrosion product was adhered to the blower tightly, and the blower could not start up Embodiment 2

Figure 3:
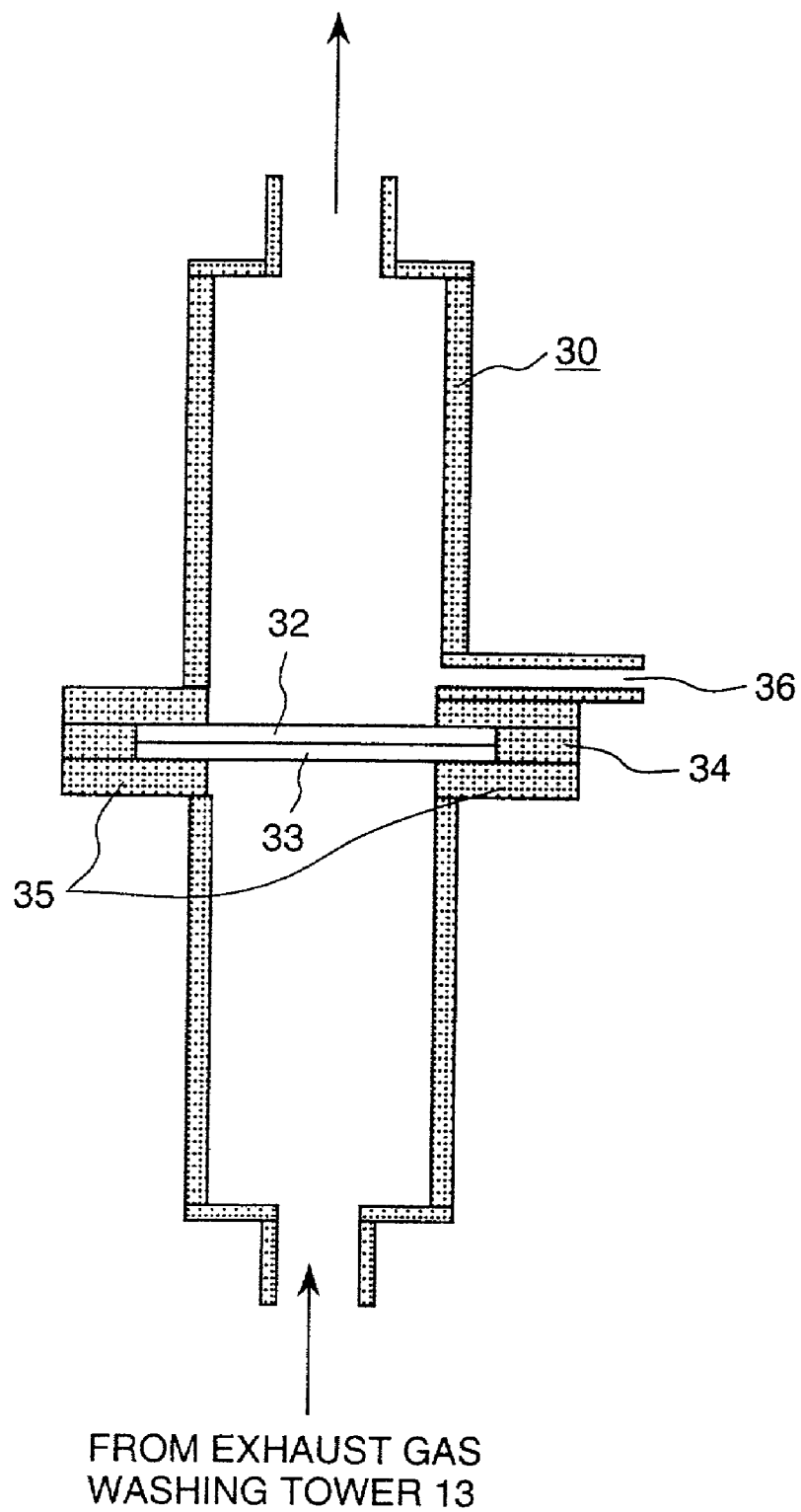
FIG. 3 is a schematic side cross section of a filter mist separator.

The similar experiment as the embodiment 1 was performed using a filter type mist separating apparatus indicated in FIG. 3, instead of the cyclone type mist separator in the embodiment 1. The filter type mist separator was cylindrical, 79 mm in inner diameter and 500 mm in height, a flange was provided at approximately middle (250 mm in height) of the cylinder, and filters 32, 33 were fixed by the flange. The filter used was commercially available filter made of glass, and two filters, one of which (filter 32) had fine pores of 100-160 μm in diameter and the other (filter 33) had fine pores of 160-250 μm in diameter, were overlapped. Thickness of the two filters were 10 mm. Gas velocity at the filter portion was 24 cm/sec. As the result, the $SO_3$ concentration before the mist separator was 138 ppm, the $SO_3$ concentration after the mist separator was 16 ppm, and it was revealed that the mist was removed by 88%. The exhaust blower was left one day after the test and disassembled, but no corrosion could be observed.

Embodiment 3

Figure 4:
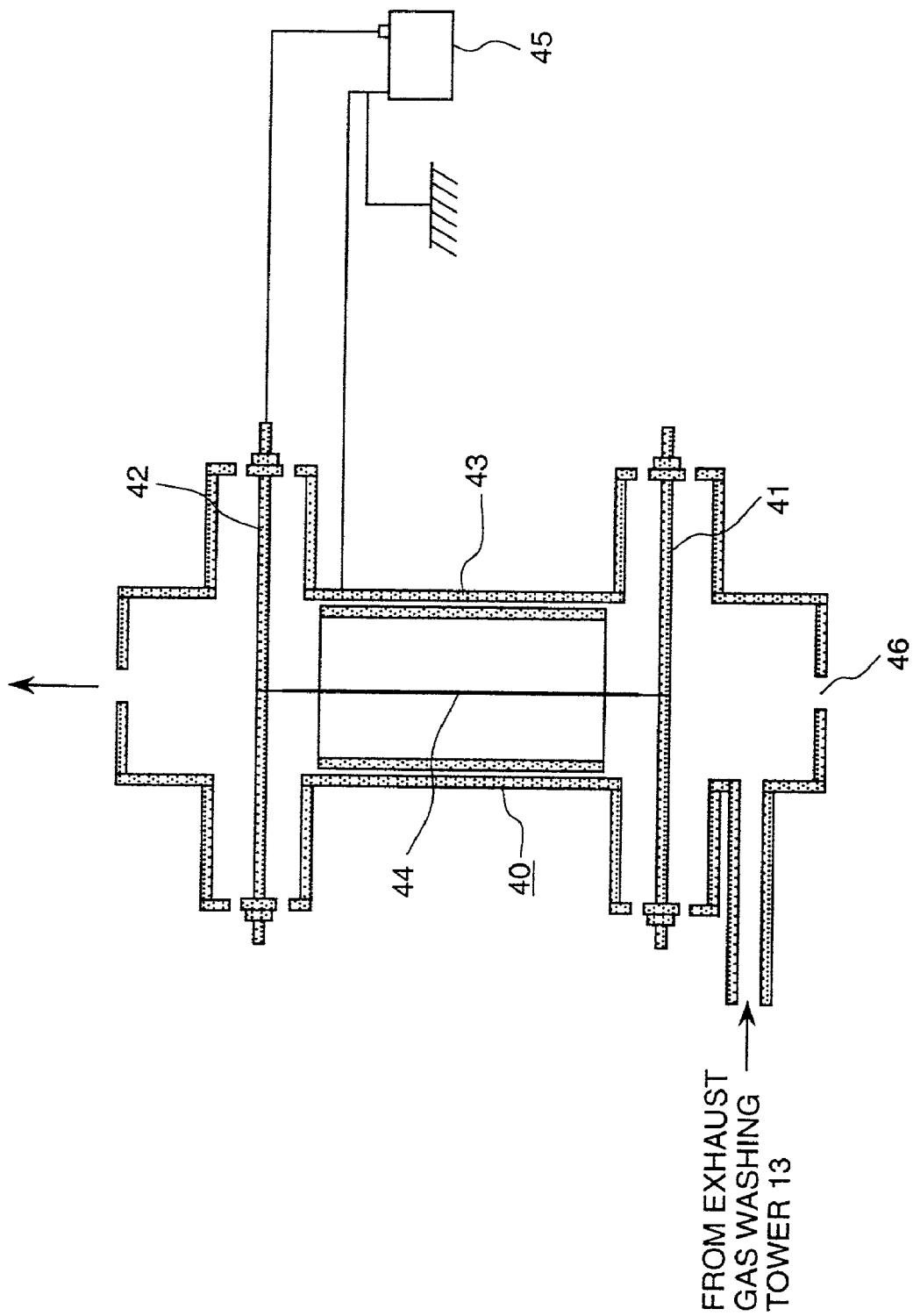
FIG. 4 is a schematic illustration indicating an electric dust collector used for separating mist.

The similar experiment as the embodiment 1 was performed using an electric dust collector indicated in FIG. 4, instead of the cyclone type mist separator in the embodiment 1. The electric dust collector was a cylinder made of vinyl chloride of 45 mm in inner diameter, and a dust collecting electrode made of stainless steel cylinder of 35 mm in inner diameter and 110 mm in length was placed therein. A discharge electrode made of tungsten wire of 0.148 mm in diameter was provided at the center of the cylinder. The discharge electrode was supported at upper and lower portions by discharge electrode supporting rods, made of stainless steel, of 3 mm in diameter. DC high voltage power supply (10 kV, 100 μA) was connected to the discharge electrode and the dust collecting electrode.

As the result of performing the $SF_6$ decomposition treatment similarly as the embodiment 1 using 8 kV, the $SO_3$ concentration at the outlet of the washing tower was 140 ppm, and the $SO_3$ concentration at the outlet of the electric dust collector was 42 ppm. Then, it was revealed that the mist removal rate was 70%. The exhaust blower was left one day after the test and disassembled, but no corrosion could be observed.

Embodiment 4

Figure 5:
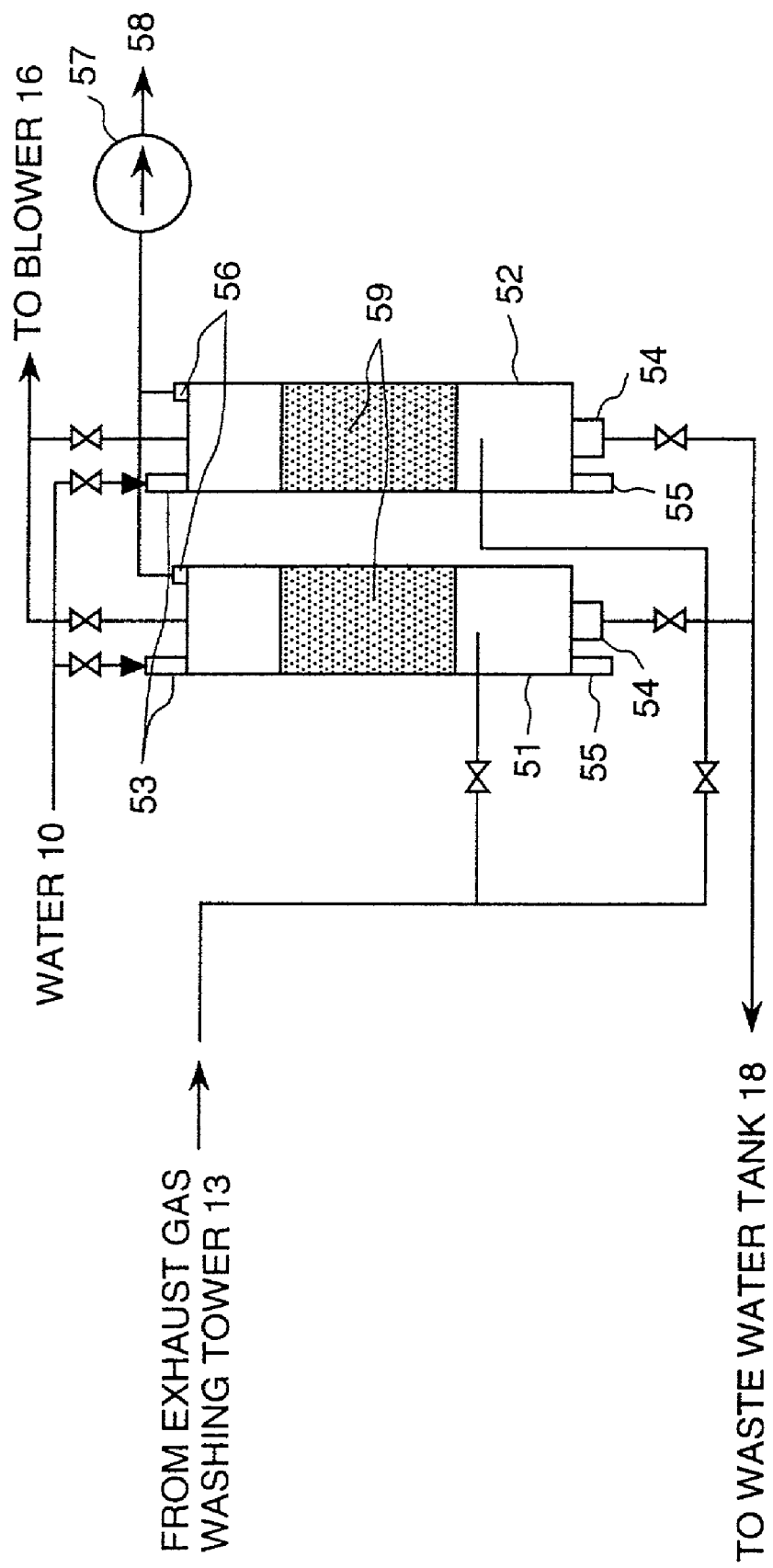
FIG. 5 is a schematic illustration indicating an active carbon absorption apparatus used for separating mist.

The similar experiment as the embodiment 1 was performed using two-tower type active carbon absorption apparatus indicated in FIG. 5 as the mist separator.

The absorption•regeneration tower is cylindrical, and its inner diameter was 200 mm and its height was 1000 mm. The space velocity in the active carbon layer was 450 $h^{-1}$. As the result, the $SO_3$ concentration at the outlet of the washing tower was 148 ppm, the $SO_3$ concentration at the outlet of the absorption apparatus was 33 ppm, and the mist removal rate was 78%. The exhaust blower was left one day after the test and disassembled, but no corrosion could be observed.

In accordance with the present invention, corrosion of the exhaust pipe or exhaust blower, which are provided in the back stream of the decomposed gas washing tower, can be suppressed in the PFC gas treatment.

What is claimed is:

1. An apparatus for treating perfluorocompound (PFC) gas comprising:
   a gas washing tower, wherein at least one of water or an aqueous alkaline solution is sprayed to PFC decomposed gas,
   an exhaust blower for exhausting the gas washed at said gas washing tower,
   a storage tank, and
   a mist separating apparatus which separates mist from said gas washed at said washing tower;
   wherein said mist separating apparatus has a mist removal means comprised of a cyclone type mist separator that removes mist by centrifugal force or a filter type mist separator that removes said mist by filtering, and said mist separating apparatus drains the mist removed by said mist removal means through a lower liquid waste outlet in a form of liquid of a gather of mists, and residual mists not removed by said mist removal means are discharged in a form of liquid of a gather of residual mists through an upper liquid waste outlet provided at an entry end of a rear stage of said mist removal means installed in the emission side of said gas exhausted by said exhaust blower, and wherein each of the said lower liquid waste outlet and said upper liquid waste outlet of said mist separating apparatus has a direct piping connection to said storage tank through which waste water is discharged into said storage tank.

2. An apparatus for treating perfluorocompound (PFC) gas as claimed in claim 1, wherein said mist separating apparatus is a cyclone type mist separating apparatus, which is composed so that the mist contained in the gas is separated by a centrifugal force.

3. An apparatus for treating perfluorocompound (PFC) gas as claimed in claim 1, wherein said mist separating apparatus is a filter type mist separating apparatus, which is composed so that the mist contained in the gas is separated by a set of filters, the set of filters is composed by overlapping plural filters which have different pore sizes from each other.

4. An apparatus for treating perfluorocompound (PFC) gas, comprising:

a decomposition apparatus for decomposing PFC to a gas containing hydrogen fluoride, a decomposed gas washing apparatus for making the gas generated by said decomposition apparatus contact with at least one of water and an aqueous alkaline solution, a storage tank, and a mist removal apparatus for separating mist, which contains PFC decomposition products, from said gas which is washed at said decomposed gas washing apparatus;

wherein said mist removal apparatus has a mist removal means comprised of a cyclone type mist separator that removes mist by centrifugal force or a filter type mist separator that removes said mist by filtering, and said mist removal apparatus is arranged to remove mist from said gas washed at said decomposed gas washing apparatus, and to drain the removed mist through a lower liquid waste outlet in a form of liquid of a gather of mists, such that residual mists not removed by said mist removal apparatus are discharged in a form of liquid of a gather of residual mists through an upper liquid waste outlet provided at an entry end of a rear stage of said mist removal apparatus installed in the emission side of said gas received from said decomposed gas washing apparatus, and wherein each of the said lower liquid waste outlet and said upper liquid waste outlet of said mist separating apparatus has a direct piping connection to said storage tank through which waste water is discharged into said storage tank.

5. An apparatus for treating perfluorocompound (PFC) gas, comprising:

a decomposition tower for decomposing PFC by any method selected from the group consisting of hydrolysis, oxidation decomposition, combustion, and thermal decomposition, a gas washing tower for contacting the gas generated by said decomposition of PFC with at least one of water and an aqueous alkaline solution, a blower for exhausting the gas washed at said gas washing tower toward outside of the tower, a storage tank, and a mist removal apparatus for separating mist, which contains PFC decomposition products, from said washed gas located at a portion before the gas washed at said gas washing tower reaches said blower;

wherein said mist removal apparatus has a mist removal means comprised of a cyclone type mist separator that removes mist by centrifugal force or a filter type mist separator that removes said mist by filtering, and said mist removal apparatus is arranged to remove mist from said gas washed at said gas washing tower, and to drain the removed mist through a lower liquid waste outlet in a form of liquid of a gather of mists, such that residual mists not removed by said mist removal apparatus are discharged in a form of liquid of a gather of residual mists through an upper liquid waste outlet provided at an entry end of a rear stage of said mist removal apparatus installed in the emission side of said gas received from said gas washing tower, and wherein each of the said lower liquid waste outlet and said upper liquid waste outlet of said mist separating apparatus has a direct piping connection to said storage tank through which waste water is discharged into said storage tank.

6. An apparatus for treating perfluorocompound (PFC) gas, comprising:

a catalyst reaction tower packed with PFC decomposition catalyst, wherein a hydrolysis reaction of PFC is generated by introducing gas containing PFC, which is diluted with nitrogen, and water and air, therein, a gas washing tower for contacting the gas, which is generated by said decomposition of PFC at said catalyst reaction tower, with at least one of water and an aqueous alkaline solution, an exhaust blower for exhausting the gas, which is washed at said gas washing tower, toward outside of the tower, a storage tank, and a mist separating apparatus for separating mist, which contains PFC decomposition products, from said washed gas at a location in the upper stage than said exhaust blower;

wherein said mist separating apparatus has a mist removal means comprised of a cyclone type mist separator that removes mist by centrifugal force or a filter type mist separator that removes said mist by filtering, and said mist separating apparatus drains the mist removed by said mist removal means through a liquid waste outlet in a form of liquid of a gather of mists, and residual mists not removed by said mist removal means are discharged in a form of liquid of a gather of residual mists through an upper liquid waste outlet provided at an entry end of a rear stage of said mist removal means installed in the emission side of said gas exhausted by said exhaust blower, and wherein each of the said lower liquid waste outlet and said upper liquid waste outlet of said mist separating apparatus has a direct piping connection to said storage tank through which waste water is discharged into said storage tank.

* * * * *